(12) United States Patent
Ainscow et al.

(10) Patent No.: US 8,090,907 B2
(45) Date of Patent: Jan. 3, 2012

(54) METHOD FOR MIGRATION OF SYNCHRONOUS REMOTE COPY SERVICE TO A VIRTUALIZATION APPLIANCE

(75) Inventors: Alexander H. Ainscow, Popley (GB); John M. Clifton, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 683 days.

(21) Appl. No.: 12/169,904

(22) Filed: Jul. 9, 2008

(65) Prior Publication Data
US 2010/0011177 A1    Jan. 14, 2010

(51) Int. Cl.
*G06F 12/08* (2006.01)

(52) U.S. Cl. ........ 711/113; 711/114; 711/142; 711/143; 711/162; 711/E12.021

(58) Field of Classification Search .................. None
See application file for complete search history.

(56) References Cited

U.S. PATENT DOCUMENTS

| | | | |
|---|---|---|---|
| 5,761,705 A * | 6/1998 | DeKoning et al. ............ 711/113 |
| 5,815,648 A * | 9/1998 | Giovannetti ....................... 714/5 |
| 6,571,324 B1 * | 5/2003 | Elkington et al. ............ 711/162 |
| 7,058,731 B2 | 6/2006 | Kodama |
| 7,149,859 B2 * | 12/2006 | Fujibayashi ................... 711/162 |
| 7,165,158 B1 * | 1/2007 | Yagawa ......................... 711/165 |
| 7,330,948 B2 * | 2/2008 | Deguchi et al. ................ 711/162 |
| 2002/0156987 A1 * | 10/2002 | Gajjar et al. ................... 711/203 |
| 2003/0033494 A1 * | 2/2003 | Fujibayashi et al. .......... 711/162 |
| 2003/0084252 A1 * | 5/2003 | Talagala ........................ 711/135 |
| 2004/0068629 A1 * | 4/2004 | Fujibayashi et al. .......... 711/162 |
| 2004/0133743 A1 * | 7/2004 | Ito et al. ........................ 711/114 |
| 2006/0161810 A1 | 7/2006 | Bao |
| 2006/0277378 A1 | 12/2006 | Morishita et al. |

OTHER PUBLICATIONS

IEEE. IEEE 100: The Authoritative Dictionary of IEEE Standards Terms. 2000. IEEE. 7th ed. p. 440.*
David Freund. "EMC Invista." Jun. 2005. Illuminata.*
Douglas W. Miller and D. T. Harper III. "Performance analysis of disk cache write policies." Apr. 1995. Elsevier. Microprocessors and Microsystems. vol. 19. No. 3. pp. 121-130.*
Megiddo, N., et al. "Outperforming LRU with an Adaptive Replacement Cache Algorithm," IEEE Computer Society, 2004.
"Cache Algorithms", http://en.wikipedia.org/wiki/Cache_algorithms, last updated Sep. 23, 2007.

* cited by examiner

*Primary Examiner* — Reginald Bragdon
*Assistant Examiner* — Nathan Sadler
(74) *Attorney, Agent, or Firm* — Scully, Scott, Murphy & Presser, P.C.; Randall J. Bluestone, Esq.

(57) ABSTRACT

A method, system, computer program product, and computer program storage device for receiving and processing I/O requests from a host device and providing data consistency in both a primary site and a secondary site, while migrating a SRC (Synchronous Peer to Peer Remote Copy) from a backend storage subsystem to a storage virtualization appliance. While transferring SRC from the backend storage subsystem to the storage virtualization appliance, all new I/O requests are saved in both a primary cache memory and a secondary cache memory, allowing a time window during which the SRC at the backend storage subsystem can be stopped and the secondary storage device is made as a readable and writable medium. The primary cache memory and secondary cache memory operates separately on each I/O request in write-through, read-write or no-flush mode.

18 Claims, 5 Drawing Sheets

METHOD FOR MIGRATION OF SYNCHRONOUS REMOTE COPY SERVICE TO A VIRTUALIZATION APPLIANCE

BACKGROUND OF THE INVENTION

1. Fields of the Invention

The present invention generally relates to Synchronous Peer to Peer Remote Copy (SRC) protocol generally, and more particularly, the present invention relates to migrating a SRC (i.e., mirroring between a primary storage device and a secondary storage device) from a backend storage subsystem (i.e., un-virtualized storage platform; e.g., IBM® DS8000) to a storage virtualization appliance (e.g., IBM® San Volume Controller).

2. Description of the Prior Art

The Peer to Peer Remote Copy (PPRC) is a protocol to mirror a primary storage device located at a primary site to a secondary storage device located at a remote site. Synchronous PPRC (SRC) causes each write to the primary storage device to be performed to the secondary storage device as well, and the I/O (Input/Output) is only considered complete when update to both primary and secondary have completed. In some applications, a customer may want to migrate his/her SRC relationship (i.e., an instance of a SRC between a primary storage device and a secondary storage device) from a backend storage subsystem (e.g., IBM® DS8000, IBM® DS4000, EMC® Symmetrix®, EMC® CLARiiON®, etc.) to a storage virtualization appliance (e.g., IBM® San Volume Controller and the like). Currently, it is not possible to perform this migration without an interruption on a host device (i.e., a server) or losing data consistency (i.e., data is consistent if all interrelated data (e.g., a group of data set) have a same instance (e.g., a value)).

A backend storage subsystem is a system comprising physical storage devices (e.g., disk array), a disk array controller, a cache memory, mirrored storage devices (i.e., a primary storage device and its mirrored secondary storage device) under a protocol (e.g., PPRC), and an interface to a virtualization storage appliance. The storage virtualization appliance is a system that contains no physical storage device but provides virtualization (i.e., a plurality of physical storage devices are appeared as a single logical storage unit) of physical storages to a host device or host application.

There are two traditional solutions to perform a migration of SRC from a backend storage subsystem to a storage virtualization appliance:

1. A first solution with no impact on the host device: The SRC must be stopped at a backend storage subsystem and a new SRC is started at a storage virtualization appliance. This solution involves copying all data from a primary storage device to a secondary storage device. During this copying, the secondary storage device loses data consistency and is thus unusable. (The definition of SRC requires two storage locations (i.e., storage sites). The storage locations are referred to as "Primary" site and "Secondary" site. A host device may exist at the primary site and a storage device at the primary site is both readable and writable. This storage device is referred to as primary storage device. The secondary site contains a secondary storage device that is only writable by the primary storage device at the primary site. This secondary storage device may be presented to a host device as read-only.)
2. A second solution with no impact on data consistency: All I/O requests from host devices must be temporarily stopped, before stopping a SRC at the backend storage subsystem and restarting the SRC at the storage virtualization appliance. This second solution does not involve copying all data from the primary storage device to the secondary storage device at backend subsystem.

Both solutions have problems:
1. For the first solution, data must be re-copied from the primary storage device to the secondary storage device at the backend storage subsystem.
   This recopying takes long time, during which time a recent backup data in the secondary storage device is not available.
   Performance of a host device will suffer during this recopying.
2. For the second solution, there is temporal service down-time (i.e., a user can not request an I/O service through a host device). The service down-time is not allowable, because most users prefer to have 100% service availability.

Therefore, it would be desirable to provide a method transferring a Synchronous Peer to Peer Remote Copy (SRC) from a backend storage subsystem to a storage virtualization appliance without interrupting a host device and without losing data consistency.

SUMMARY OF THE INVENTION

The present invention is a system, method, and computer program product for using cache memories and I/O tagging (i.e., appending a piece of data on an I/O request from a host device) to provide a user with a window (i.e., a timeframe), during which a user is able to stop SRC (i.e., a primary storage device and its mirrored secondary device) at the backend storage subsystem, and restart the SRC at the storage virtualization appliance, while always providing I/O services to a host device.

While SRC is instantaneously transferred from the backend storage subsystem to the storage virtualization appliance, all I/O requests are saved at cache memories in the primary site and secondary site, allowing a time window (i.e., after all outstanding I/O request directed to the backend storage subsystem are completed and before the cache memories fills up) during which the SRC at the backend storage subsystem is stopped and the SRC is made available at the storage virtualization appliance.

Thus, there is provided a system for servicing an I/O request from a host device while migrating SRC (Synchronous Peer to Peer Remote Copy) from a backend storage subsystem to a storage virtualization appliance, the SRC including a primary storage device at a primary site and a secondary storage device at a secondary site, the system comprising:

means for receiving an I/O request from a host device, the I/O request being directed to the primary storage device or the secondary storage device;

an I/O tag appending means for appending a cache operation tag on the I/O request, the cache operation tag indicating one of: a read-write mode indicating the I/O request is completed by a cache memory and the I/O request is sent to the backend storage subsystem later, a no-flush mode indicating the I/O request is completed by a cache memory and the I/O request is not sent to the backend storage subsystems until the no-flush mode is turned off, and a write-through mode indicating the I/O request is forwarded to the backend storage subsystem by a cache memory and the I/O request is completed by the backend storage subsystem;

a primary cache memory, at the primary site, for receiving and storing the I/O request with the cache operation tag from the I/O tag appending means and operating according to one of: the read-write mode, the no-flush mode, and the write-through mode; and a secondary cache memory, at a secondary site, for receiving and storing the I/O request with the cache operation tag from the I/O tag appending means and for operating according to one of two modes, the two modes comprising: the read-write mode and the no-flush mode, wherein data consistency is maintained between the primary cache memory and the secondary cache memory.

Thus, there is provided a method for servicing an I/O request from a host device while migrating SRC (Synchronous Peer to Peer Remote Copy) from a backend storage subsystem to a storage virtualization appliance, the SRC including a primary storage device at a primary site and a secondary storage device at a secondary site, the system comprising:

receiving an I/O request from a host device, the I/O request being directed to the primary storage device or the secondary storage device;

appending a cache operation tag on the I/O request, the cache operation tag indicating one of: a read-write mode indicating the I/O request is completed by a cache memory and the I/O request is sent to the backend storage subsystem later, a no-flush mode indicating the I/O request is completed by a cache memory and the I/O request is not sent to the backend storage subsystems until the no-flush mode is turned off, and a write-through mode indicating the I/O request is forwarded to the backend storage subsystem by a cache memory and the I/O request is completed by the backend storage subsystem;

receiving and storing the I/O request with the cache operation tag at a primary cache memory and operating the primary cache memory according to one of: the read-write mode, the no-flush mode, and the write-through mode; and receiving and storing the I/O request with the cache operation tag at a secondary cache memory and operating the secondary cache memory according to one of two modes, the two modes comprising: the read-write mode and the no-flush mode, wherein data consistency is maintained between the primary cache memory and the secondary cache memory.

Advantageously, the present invention operates to perform SRC migration between a backend storage subsystem and a storage virtualization appliance with the following:
1. There is no service down-time at a host device (i.e., a host device can continuously issue I/O requests).
2. Data consistency is preserved. (i.e., the primary storage device and the secondary storage device stores consistent data.)
3. A host device performance is not affected.

Operating a SRC at the backend storage subsystem has following restrictions:
1. Cache memory must be write-through (i.e., an I/O request from a host is submitted to a storage virtualization appliance. The storage virtualization appliance transfers the I/O request to the cache memory. The cache memory receives the I/O request but directly forwards the I/O request to the backend storage subsystem without saving the I/O request at the cache memory. The backend storage subsystem completes the I/O request and sends a completion notice to the cache memory. The cache memory sends the completion notice to the host) or disabled.
2. There must be one-to-one mapping between the storage virtualization appliance and the backend storage subsystem.

Operating a SRC (i.e., mirroring between a primary storage device and a secondary storage device) at a storage virtualization appliance has following benefits:
1. An extra cache memory can be installed at the storage virtualization appliance. The extra cache improves performance for a host device or host application.
2. Physical storage at a current backend storage subsystem can be migrated to a new backend storage subsystem (i.e., the current backend storage subsystem can be replaced by a new backend storage subsystem), without impacting I/O services (e.g., writing data).
3. There is a single set of SRC at a storage virtualization appliance being independent of a backend storage subsystem.
4. Physical storage can be efficiently used.
5. Data migration (i.e., moving data to other storage appliance) can be performed without impacting a host device or host application.
6. Data stripping (i.e., spreading data on a virtualized disk across many physical disks) can be achieved.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION

Figure 1:
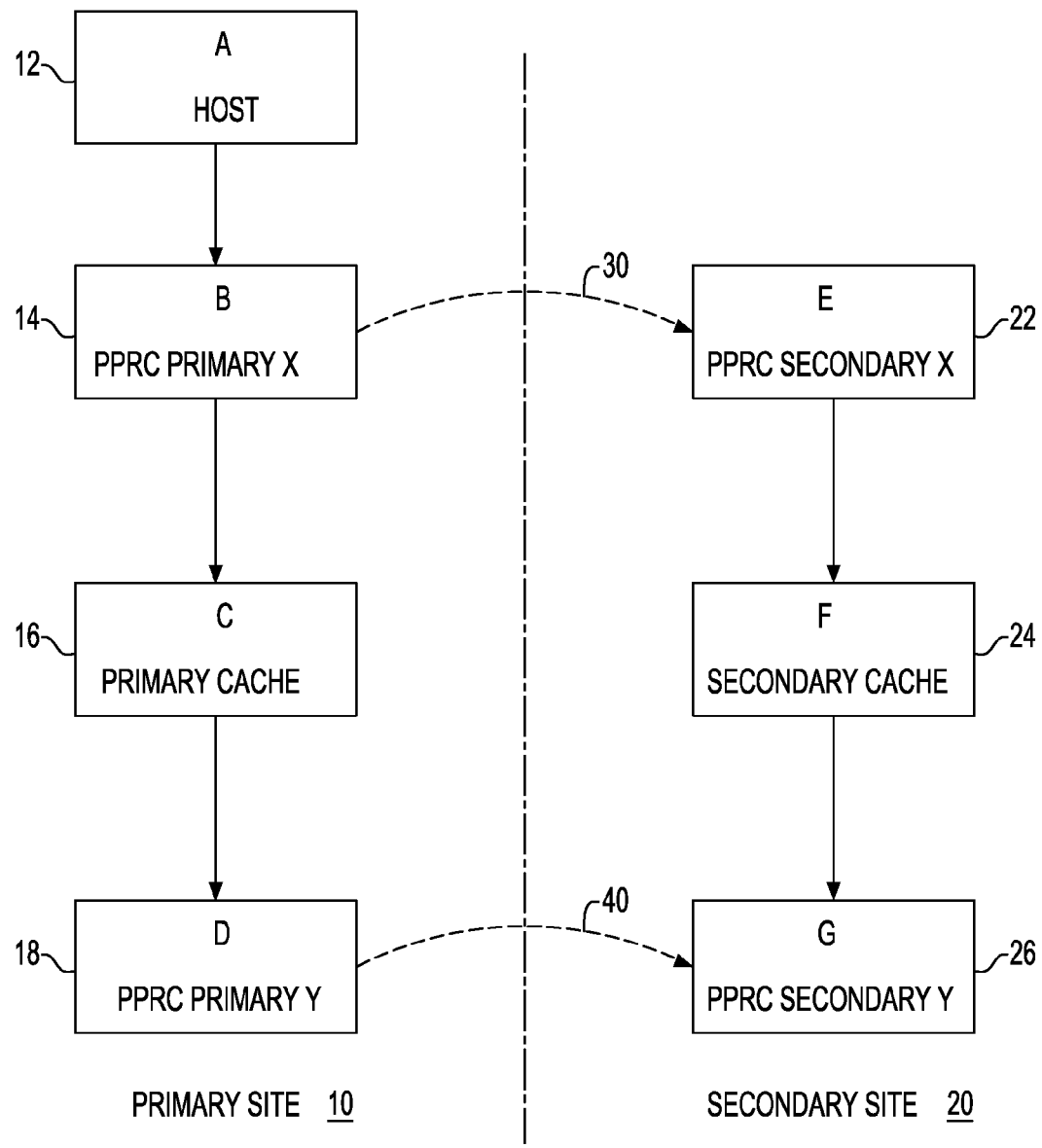
FIG. 1 depicts a block diagram of one embodiment of the present invention.

FIG. 1 illustrates a block diagram of one embodiment of a system employing the present invention. Especially, FIG. 1 depicts an environment where a migration of SRC (Synchronous Peer to Peer Remote Copy) from a backend storage subsystem (e.g., IBM® DS8000, IBM® DS4000, EMC® Symmetrix®, EMC® CLARiion®, etc.) to a storage virtualization appliance (e.g., IBM® San Volume Controller) occurs. The Peer to Peer Remote Copy (PPRC) is a protocol to mirror data stored at a primary storage device (e.g., PPRC Primary Y 18) at a primary site 10 to data stored at a secondary storage device (e.g., PPRC Secondary Y 26) at a secondary site 20. Under Synchronous PPRC (SRC), each write to the primary storage device (e.g., PPRC Primary Y 18) is also performed to the secondary storage device (e.g., PPRC Secondary Y 26). In one embodiment, a mirrored write to a secondary storage device (e.g., PPRC Secondary Y 26) is performed by a primary storage device (e.g., PPRC Primary Y 18) via a physical link 40. Under SRC protocol, the I/O is only considered complete when writing to both the primary storage device (e.g., PPRC Primary Y 18) and the secondary storage device (e.g., PPRC Secondary Y 26) are completed. Under SRC protocol, there are two sites, "Primary site 10" and "Secondary site 20". There are a host device or host application 12, a primary storage virtualization appliance (e.g., PPRC Primary X 14), a primary cache memory 16, and a primary storage device (e.g., PPRC Primary Y 18) at a primary site 10. There are a secondary storage virtualization appliance (e.g., PPRC Secondary X 22), a secondary cache memory 24, and a secondary storage device (e.g., PPRC Secondary Y 26) at a secondary site 20. The primary storage virtualization appliance and the secondary storage virtualization appliance are at a storage virtualization appliance (e.g., IBM® San Volume Controller). The primary storage virtualization appliance and the secondary storage virtualization appliance are created and configured upon installation of the storage virtualization appliance. The primary storage device and the secondary storage device exist at a backend storage subsystem (e.g., IBM® DS8000, IBM® DS4000, EMC® Symmetrix®, EMC® CLARiion®, etc.). The primary storage virtualization appliance (e.g., PPRC Primary X 14) stores a virtualized representation (e.g., a logical representation) of data on the primary storage device (e.g., PPRC Primary Y 18). The secondary storage virtualization appliance (e.g., PPRC Secondary X 22) stores a virtualized representation (e.g., a logical representation) of data on the secondary storage device (e.g., PPRC Secondary Y 26).

Before a migration of a SRC (i.e., mirroring between a primary storage device and a secondary storage device) from the backend storage subsystem to the storage virtualization appliance, the storage virtualization appliance has been installed and storage devices at the backend storage subsystem are presented to the host device or host application 12 through the storage virtualization appliance. An I/O request is submitted from a host device or host application 12 to the storage virtualization appliance. Before the migration of the SRC, SRC (i.e., mirroring between a primary storage device and a secondary storage device) at the backend storage subsystem is active. Data consistency is maintained by data transfer from the primary storage device to the secondary storage device via a physical link 40. For example an I/O request is submitted via a host 12→a primary storage virtualization appliance (e.g., PPRC Primary X 14)→a primary cache memory 16→a primary storage device (e.g., PPRC Primary Y 18)→(a physical link 40)→a secondary storage device (e.g., PPRC Secondary Y 26). Arrows in FIG. 1 indicates direction in which an I/O request is submitted. In one embodiment, the primary storage device (e.g., PPRC Primary Y 18) and the secondary storage device (e.g., PPRC Secondary Y 26) are non-volatile memory devices (e.g., a RAID array or a disk drive). The secondary storage device (e.g., PPRC Secondary Y 26) is only writeable by the primary storage device (e.g., PPRC Primary Y 18) and only readable by the secondary storage virtualization appliance (e.g., PPRC Secondary X 22) via a secondary cache memory 24.

While transferring SRC from the backend storage subsystem to the storage virtualization appliance, cache memories (e.g., the primary cache memory 16 and the secondary cache memory 24) guarantees that no new I/O request is submitted to the backend storage subsystem by operating at no-flush mode. (i.e., new I/O requests are saved at cache memories and then cache memories send I/O request completion notices to a host device or host application 12. The saved new I/O requests are sent to the backend storage subsystem after completion of transferring SRC) While the cache memories (the primary cache memory 16 and the secondary cache memory 24) are being filled up, the transferring SRC is completed (i.e., the SRC is stopped at the backend storage subsystem and a new SRC is made available at the storage virtualization appliance). In one embodiment, the SRC at the backend storage subsystem is stopped (i.e., mirroring between the primary storage device and the secondary storage device via a physical link 40 is stopped), after the outstanding I/O requests (i.e., I/O requests that were sent to the backend storage subsystem but have not been completed; I/O requests that were sent to the backend storage subsystem but the backend storage subsystem has not yet acknowledged receipts) directed to the backend storage subsystem are completed.

After completing the migration of the SRC from the backend storage subsystem to the storage virtualization appliance, SRC at the storage virtualization appliance is active (i.e., mirroring between a primary storage device and a secondary storage device is maintained at the storage virtualization appliance). Data consistency between the primary site 10 and the secondary site 20 is maintained by data transfer from the primary storage virtualization appliance to the secondary storage virtualization appliance via a physical link 30. For example, an I/O request is submitted via a host 12→a primary storage virtualization appliance (e.g., PPRC Primary X 14)→a primary cache memory 16→a primary storage device (e.g., PPRC Primary Y 18). At the same time, the same I/O request is submitted to a host 12→a primary storage virtualization appliance (e.g., PPRC Primary X 14)→(a physical link 30)→a secondary storage virtualization appliance (e.g., PPRC Secondary X 22)→a secondary cache memory 24→a secondary storage device (e.g., PPRC Secondary Y 26). Though the I/O request is split at the primary storage virtualization appliance (e.g., PPRC Primary X 14), the host 12 does not know about the two routes (e.g., 12→14→16→18 and 12→14→(30)→22→24→26). The primary storage device (e.g., PPRC Primary Y 18) and the secondary storage device (e.g., PPRC Secondary Y 26) are same non-volatile memory devices (e.g., a RAID array or a disk drive) used before the migration of the SRC.

Before the migration of the SRC or after the migration of the SRC, each I/O request is sent once over one link only (e.g., via a physical link 30 or a physical link 40). To maintain data consistency, an order of I/O requests that is submitted to the primary site 10 must be identical to an order of I/O requests that is submitted to the secondary site 20. Though the secondary storage virtualization appliance (e.g., PPRC Secondary X 22) exists before the migration of the SRC, the secondary storage virtualization appliance (e.g., PPRC Secondary X 22) only receives I/O requests after completing the migration of the SRC. In one embodiment, I/O requests are submitted to the primary storage device via a same route before the migration of the SRC or after the migration of the SRC. However, I/O requests are submitted to the secondary storage device via a different route after the migration of the SRC. In one embodiment, the secondary storage device (e.g., PPRC Secondary Y 26) is only readable by the secondary storage virtualization appliance (e.g., PPRC Secondary X 22) via a secondary cache memory 24. In one embodiment, while transferring SRC from the backend storage subsystem to the storage virtualization appliance, nothing is physically transferred, but I/O requests are routed differently afterwards. And, a different SRC application (e.g., executing at a storage virtualization appliance) will be active after the transferring SRC.

Figure 4:
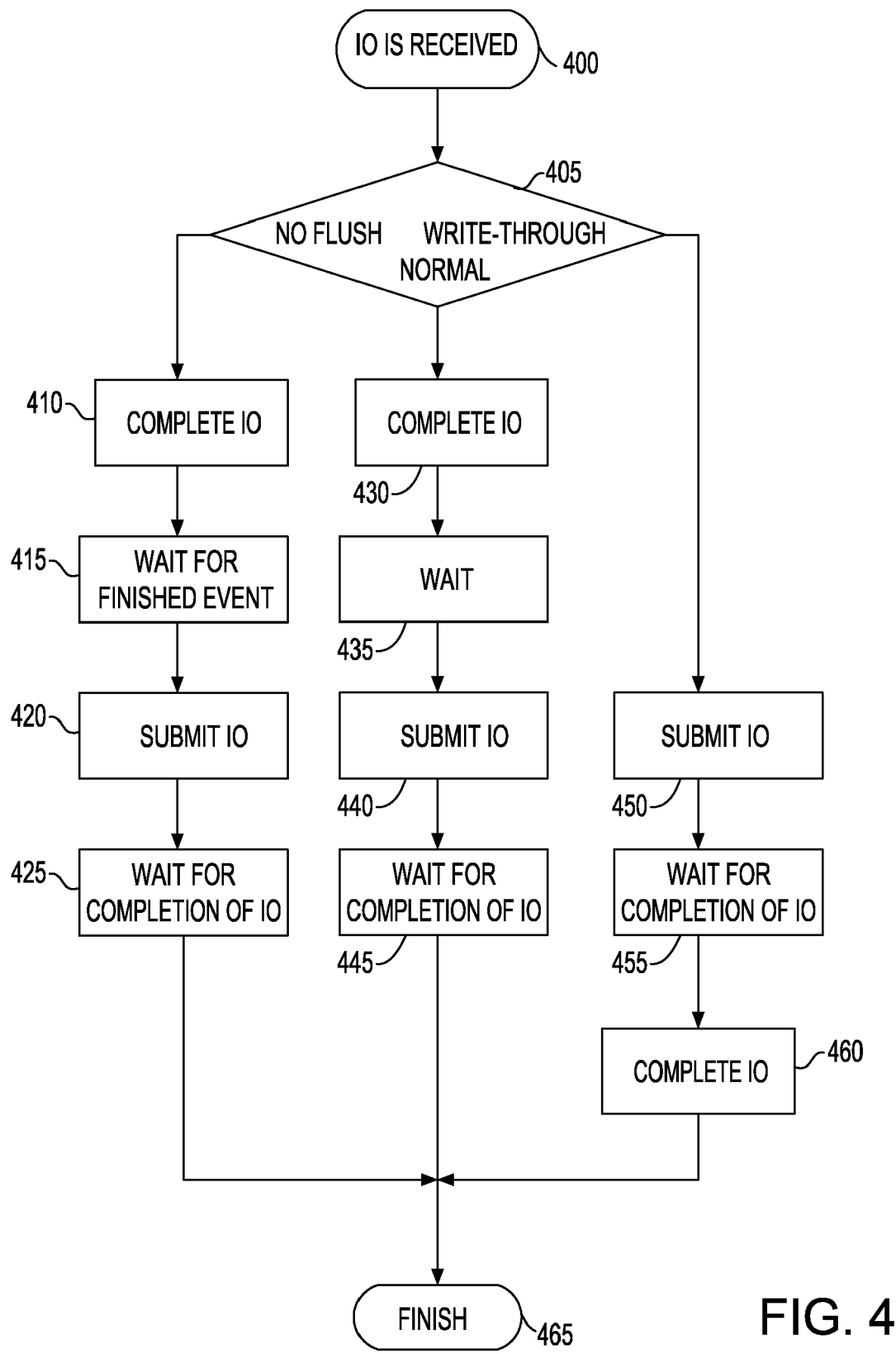
FIG. 4 depicts a behavior of a primary cache and a secondary cache memory.

FIG. 4 illustrates a behavior of cache memories (i.e., the primary cache memory 16 and the secondary cache memory 24). The cache memories operate at one of: a write-through mode (i.e., after an I/O request is completed by a backend storage subsystem, the I/O request is indicated as completed), a no-flush mode (i.e., an I/O request is completed by a cache memory and the I/O request is not sent to backend storage subsystem until the no-flush mode is turned off), and a normal mode (i.e., a read-write mode; an I/O request is completed by a cache memory and the I/O request is sent to backend storage subsystem some time later). A host device (i.e., a server) or a host application 12 sends an I/O request to a storage virtualization appliance. The storage virtualization appliance forwards the I/O request to a cache memory (i.e. a primary cache memory 16 or a secondary cache memory 24). At step 400, the cache memory (i.e. a primary cache memory 16 or a secondary cache memory 24) receives the I/O request. At step 405, an operation mode of the cache memory is decided based on the received I/O request. In one embodiment, the I/O request received at the cache memory (i.e. a primary cache memory 16 or a secondary cache memory 24) includes cache operation tag information that indicates a preferred cache memory operation mode for the I/O request (e.g., an I/O request with a no-flush mode operation tag). In another embodiment, the cache memory operation mode is set by a user via a graphical user interface or common style interface.

When the cache memory operates at the no-flush mode, at step 410, the cache memory saves the received I/O request and sends an I/O request completion notice (e.g., a signal or a message) to the host device or the host application 12. At step 415, the cache memory waits until the no-flush mode is turned off. After the no-flush mode is turned off (i.e., the cache memory operation mode becomes the normal mode), at step 420, the cache memory submits the I/O request to the backend storage subsystem. In one embodiment, the cache memory operation mode is changed from the no-flush mode to the normal mode, when a migration of a SRC from the backend storage subsystem to the storage virtualization appliance is completed. In one embodiment, there is a completion event flag that indicates a completion of a migration of a SRC from the backend storage subsystem to the storage virtualization appliance. Therefore, when the completion event flag is set to indicate that the migration of the SRC is completed, the cache memory operation mode is changed from no-flush mode to the normal mode. In another embodiment, a user changes a cache memory configuration or setting (i.e., changes the cache memory operation mode) via the graphical user interface or common style interface. At step 425, the cache memory waits, until the backend storage subsystem completes the I/O request and the backend storage subsystem sends an I/O request completion notice (e.g., a signal or a message) to the cache memory. At step 465, the I/O request is marked as completed at the cache memory.

When the cache memory operates at the normal mode (i.e., read-write mode), at step 430, the cache memory saves the received I/O request and sends an I/O request completion notice (e.g., a signal or a message) to the host device or the host application 12. At step 435 the cache memory waits for a wait period. In one embodiment, the wait period in the cache memory is defined by a caching algorithm (e.g., Belady's optimal algorithm, clairvoyant algorithm, Least Recently Used (LRU), etc). Diverse caching algorithms can be found at http://en.wikipedia.org/wiki/Cache_algorithms. After the wait period is passed, at step 440, the cache memory submits the I/O request to the backend storage subsystem. At step 445, the cache memory waits, until the backend storage subsystem completes the I/O request and the backend storage subsystem sends an I/O request completion notice (e.g., a signal or a message) to the cache memory. At step 465, the I/O request is marked as completed at the cache memory.

When the cache memory operates at the write-through mode, at step 450, the cache memory directly sends the received I/O request to the backend storage subsystem without saving the received I/O request. At step 455, the cache memory waits until the backend storage subsystem completes the I/O request and the backend storage subsystem sends an I/O request completion notice (e.g., a signal or a message) to the cache memory. At step 460, after receiving the I/O request completion notice, the cache memory sends the I/O request completion notice to the host device or the host application 12. At step 465, the I/O request is marked as completed. In one embodiment, if an I/O request is tagged with a write-through operation mode (i.e., an I/O request with a write-through operation mode tag), this I/O request overrides a cache memory setting. For example, though a cache memory is set to the no-flush mode or the normal mode (i.e., read-write mode), if an I/O request tagged with a write-through operation mode arrives, a cache memory that receives the I/O request (i.e., the I/O request tagged with a write-through operation mode) operates at the write-through mode.

Figure 2:
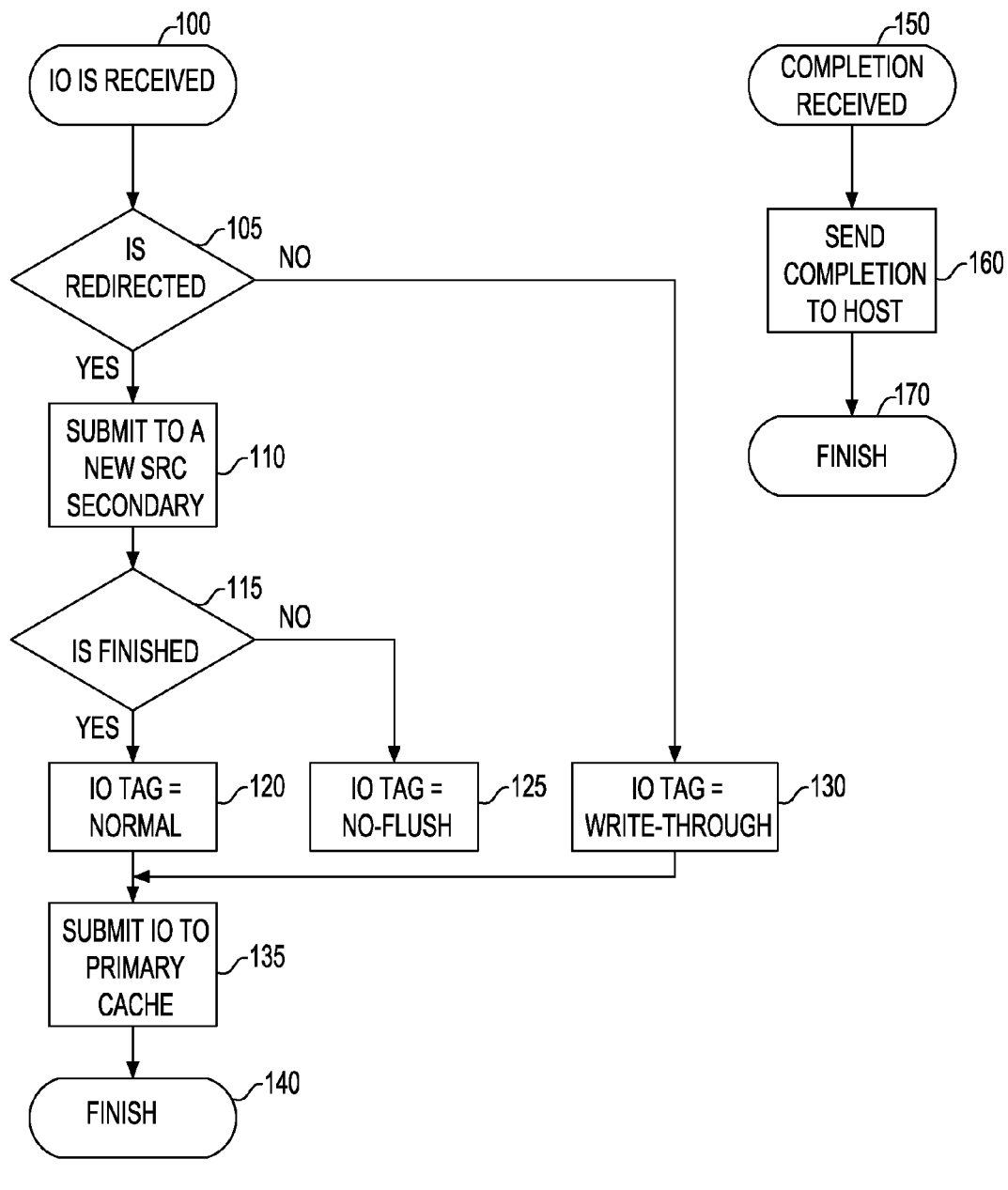
FIG. 2 is a flow chart depicting I/O request flow path at the primary site of the storage virtualization appliance.

FIG. 2 is a flow chart depicting I/O request flow path at the primary site 10 of the storage virtualization appliance. At step 100, an I/O request is received at a storage virtualization appliance from a host device or host application 12. Step 105 checks whether a redirection event flag is set. The redirection event flag indicates the I/O request needs to be redirected to a SRC (i.e., an I/O request is submitted to the secondary site 20 via a physical link 30; SRC at the storage virtualization appliance is active now) at the storage virtualization appliance. When the redirection event flag is not set (i.e., an I/O request is still submitted to the secondary site 20 via a physical link 40), the I/O request is tagged with a write-through operation mode tag at step 130 and then is submitted to a primary cache memory 16 at step 135. However, while preparing a migration of a SRC from a backend storage subsystem to a storage virtualization appliance or while outstanding I/O requests (i.e., I/O requests has been received but has not been submitted to a backend storage subsystem to complete the I/O requests) exists in the primary cache memory 16, the redirection event flag becomes set. In one embodiment, there is a redirection detection means (e.g., a sensor) that detects whether the redirection event flag is set or not. When the redirection event flag is set (i.e., SRC at the storage virtualization appliance is active now), at step 110, the I/O request is submitted to a primary storage device (e.g., PPRC Primary Y 18) via a host 12→a primary storage virtualization appliance (e.g., PPRC Primary X 14)→a primary cache memory 16→a primary storage device (e.g., PPRC Primary Y 18). At the same time, the same I/O request is submitted to the secondary storage device (e.g., PPRC Secondary Y 26) via a host 12→a primary storage virtualization appliance (e.g., PPRC Primary X 14)→(a physical link 30)→a secondary storage virtualization appliance (e.g., PPRC Secondary X 22)→a secondary cache memory 24→a secondary storage device (e.g., PPRC Secondary Y 26). The I/O request is split at a primary storage virtualization appliance (e.g., PPRC Primary X 14). At step 115, it is checked whether the migration of the SRC from the backend storage subsystem to the storage virtualization appliance is completed or not. In one embodiment, there is a completion event flag that indicates a completion of transferring SRC from the backend storage subsystem to the storage virtualization appliance. In one embodiment, a migration detection means (i.e., a sensor) is provided to detect whether the completion event flag is set or not. If the migration of the SRC is not completed, the I/O request is tagged with a no-flush operation mode tag at step 125 and then is submitted to the primary cache memory 16 at step 135. If the migration of the SRC is completed, the I/O request is tagged with a normal (i.e., read-write) operation mode tag at step 120 and then is submitted to the primary cache memory 16 at step 135. In one embodiment, tag information (e.g., no-flush operation mode tag) appended to an I/O request is read by the primary cache memory 16 and then each I/O request is processed based on each tag information appended to each I/O request. At step 140, the I/O request is saved at the primary cache memory 16 or is submitted to a primary storage device 18 at the backend storage subsystem. After the primary cache memory 16 receives an I/O request with a no-flush operation mode tag or an I/O request with a normal operation mode tag, the primary cache memory 16 saves the received I/O request and sends an I/O request completion notice to a host device or a host application 12. However, when the primary cache memory 16 receives an I/O request with a write-through operation mode tag, the primary cache memory 16 directly sends the I/O request to the backend storage subsystem without saving the I/O request. Then, at step 150, the primary cache memory 16 waits until the backend storage subsystem sends an I/O request completion notice to the primary cache memory 16. At step 160, after receiving the I/O request completion notice from the backend storage subsystem, the primary cache memory 16 sends an I/O request completion notice to a host device or a host application 12 from which the I/O request is issued. At step 170, the I/O request is marked as completed.

Figure 3:
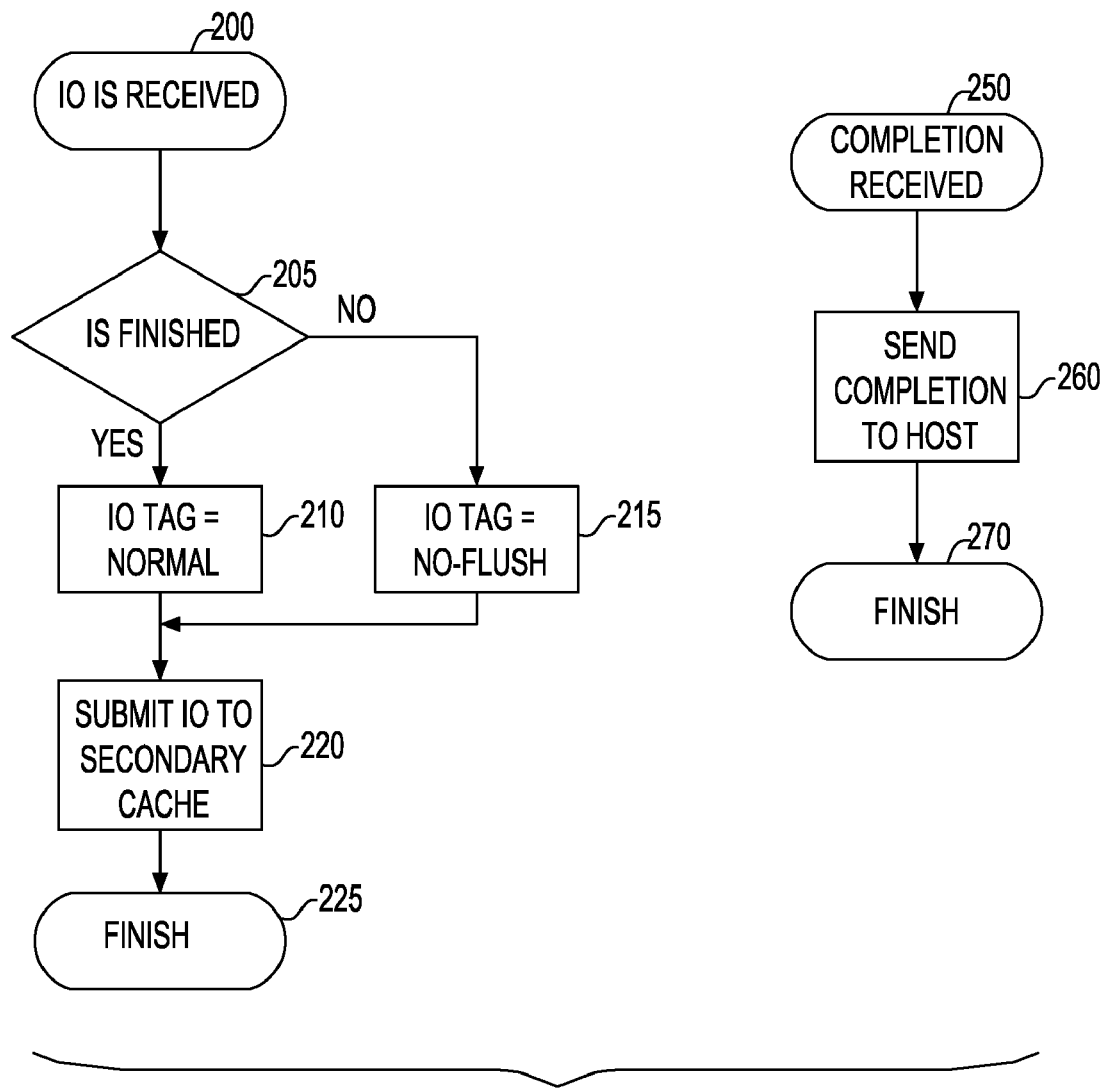
FIG. 3 a flow chart depicting I/O request flow path at the secondary site of the storage virtualization appliance.

FIG. 3 is a flow chart depicting I/O request flow path at the secondary site 20 of the storage virtualization appliance. At step 200, an I/O request is received at a storage virtualization appliance. At step 205, it is checked whether the migration of SRC (i.e., a primary storage device and its mirrored secondary storage device) from the backend storage subsystem to the storage virtualization appliance is completed or not. In one embodiment, there is a completion event flag that indicates a completion of transferring SRC from the backend storage subsystem to the storage virtualization appliance. A migration detection means (i.e., a sensor) may be provided to detect whether the completion event flag is set or not. If the migration of the SRC is not completed, the I/O request is tagged with a no-flush operation mode tag at step 215 and then is submitted to the secondary cache memory 24 at step 220. If the migration of the SRC is completed, the I/O request is tagged with a normal (i.e., read-write) operation mode tag at step 210 and then is submitted to the secondary cache memory 24 at step 220. In one embodiment, tag information (e.g., no-flush operation mode tag) is appended to an I/O request and then each I/O request is processed by cache memories (e.g., a primary cache memory 16 and a secondary cache memory 24) based on each tag information appended to each I/O request. At step 225, the I/O request is saved at the secondary cache memory 24 or is submitted to a secondary storage device 26 at the backend storage subsystem. In one embodiment, the secondary cache memory 24 operates at one of the no-flush mode and the normal mode. In this embodiment, after the secondary cache memory 24 receives an I/O request with a no-flush operation mode tag or an I/O request with a normal operation mode tag, the secondary cache memory 24 saves the received I/O request and sends an I/O request completion notice to a host device or a host application 12. In an alternative embodiment, the secondary cache memory 24 operates at one of the write-through mode, the no-flush mode and the normal mode. In this alternative embodiment, when the secondary cache memory 24 receives an I/O request with a write-through operation mode tag, the secondary cache memory 24 directly sends the I/O request to the backend storage subsystem without saving the I/O request. Then, at step 250, the secondary cache memory 24 waits until the backend storage subsystem sends an I/O request completion notice to the secondary cache memory 24. At step 260, after receiving the I/O request completion notice from the backend storage subsystem, the secondary cache memory 24 sends the I/O request completion notice to a host device or a host application 12 from which the I/O request is issued. At step 270, the I/O request is marked as completed.

Figure 5:
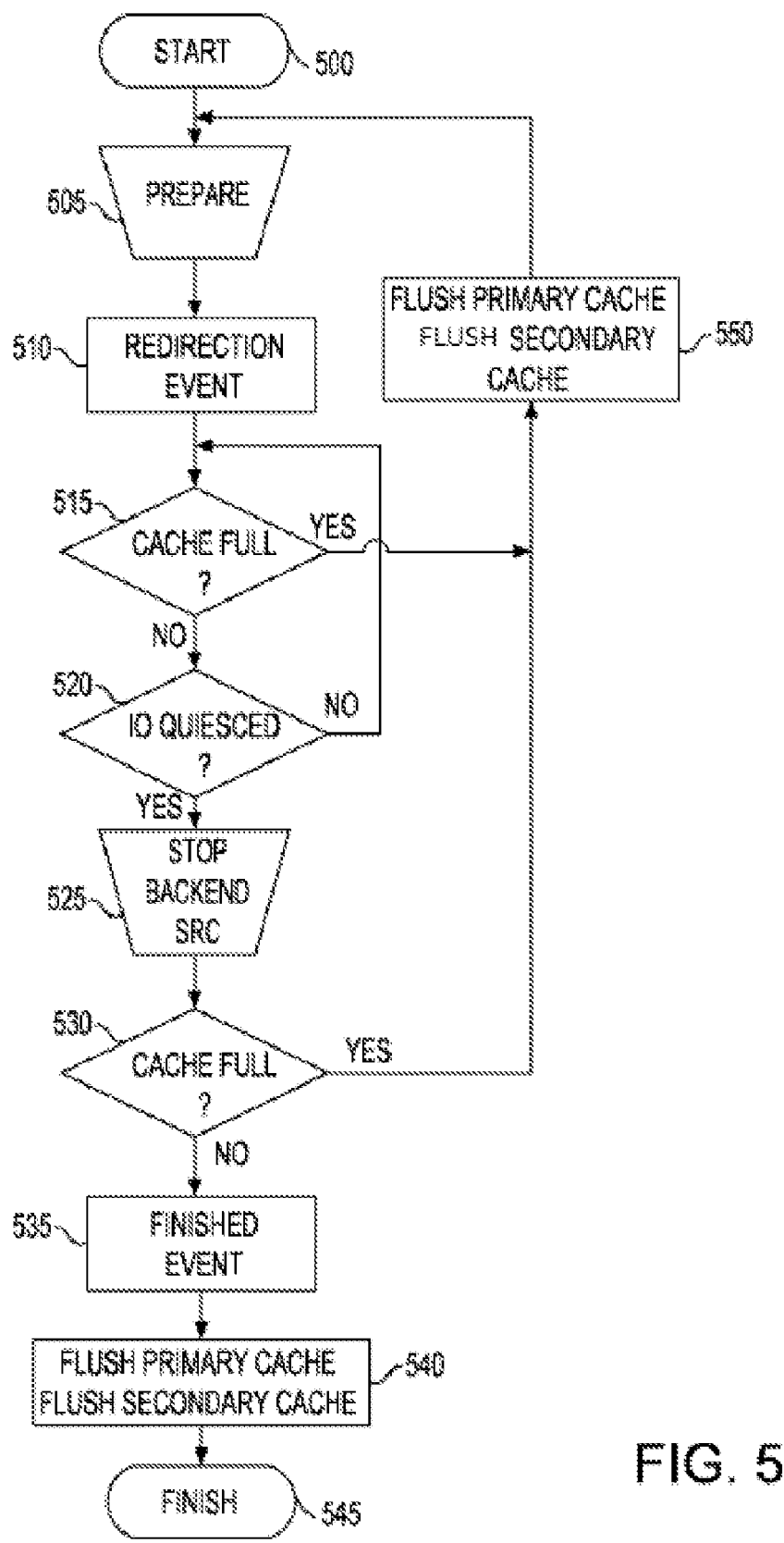
FIG. 5 illustrates a flow chart that one embodiment of the present invention employs.

FIG. 5 depicts a flow chart that one embodiment of the present invention employs. At step 500, a user starts a SRC (i.e., mirroring between a primary storage device and a secondary storage device) at backend storage subsystem (e.g., data is transferred from PPRC Primary Y 18 to PPRC Secondary Y 26 via a physical link 40), if the SRC at the backend storage subsystem was stopped before. If the SRC at the backend storage subsystem is just started, the user waits until a primary storage device (e.g., PPRC Primary Y 18) and a secondary storage device (e.g., PPRC Secondary Y 26) maintain consistent data. At step 505, the secondary storage device (e.g., PPRC Secondary Y 26) at the backend storage subsystem is mapped as a read-only medium to a storage virtualization appliance. (The primary storage device (e.g., PPRC Primary Y 18) at the backend storage subsystem is mapped as a readable and writable medium to the storage virtualization appliance.) A SRC at the storage virtualization appliance is installed (e.g., a physical link 30 is installed, but is not active yet). However, I/O requests are not directed to the SRC at the storage virtualization appliance (e.g., a physical link 30 in FIG. 1 is not utilized at this time).

At step 510, a redirection event flag is set. The redirection event flag indicates an I/O request from a host device or a host application 12 needs to pass through the SRC at the storage virtualization appliance (e.g., an I/O request is submitted to the PPRC Primary Y 18 via a host device 12→a PPRC Primary X 14 at the storage virtualization appliance→a primary cache memory 16→the PPRC Primary Y 18 at the backend storage subsystem. At the same time, that I/O request is submitted to the PPRC Secondary Y 26 via a host device 12→a PPRC Primary X 14 at the storage virtualization appliance→(a physical link 30)→a PPRC Secondary X 22 at the storage virtualization appliance→a secondary cache memory 24→the PPRC Secondary Y 26 at the backend storage subsystem). The redirection event flag is also used for setting a cache memory operation mode (e.g., no-flush mode or normal mode) in FIG. 2.

At step 515, it is checked whether the primary cache memory 16 or the secondary cache memory 24 is full. A cache memory (e.g., a primary cache memory 16 or a secondary cache memory 24) is full, if no space is available for writing new data (e.g., an I/O request). If the primary cache memory 16 or the secondary cache memory 24 is full (e.g., before completing a migration of the SRC from the backend storage subsystem to the storage virtualization appliance), at step 550, the primary cache memory 16 and the secondary cache memory 24 are flushed (i.e., all data including I/O request tagged with no-flush mode is discarded in the primary cache memory 16 and the secondary cache memory 24). Upon flushing cache memories (e.g., the primary cache memory 16 and the secondary cache memory 24), a migration of SRC from the backend storage subsystem to the storage virtualization appliance is prepared again from step 505.

If the cache memories (e.g., the primary cache memory 16 and the secondary cache memory 24) are not full, it is checked whether there is an outstanding I/O request in the primary cache memory 16. At step 520, when there is no outstanding I/O request in the primary cache memory 16, no new I/O request is submitted to the backend storage subsystem. If there is an outstanding I/O request in the primary cache memory 16, the outstanding I/O(s) in the primary cache memory 16 are processed by the backend storage subsystem by repeating steps 515-520. When no outstanding I/O request in the primary cache memory 16 or all outstanding I/O requests are completed at the backend storage subsystem, at step 525, SRC at the backend storage subsystem is stopped (e.g., a physical link 40 in FIG. 1 is not used anymore). At step 530, it is checked whether the primary cache memory 16 or the secondary cache memory 24 is full. If the primary cache memory 16 or the secondary cache memory 24 is full (e.g., before completing a migration of the SRC from the backend storage subsystem to the storage virtualization appliance), at step 550, the primary cache memory 16 and the secondary cache memory 24 are flushed (i.e., all data including I/O request tagged with no-flush mode is discarded in the primary cache memory 16 and the secondary cache memory 24). Upon flushing cache memories (e.g., the primary cache memory 16 and the secondary cache memory 24), a migration of SRC from the backend storage subsystem to the storage virtualization appliance is prepared again from step 505.

If cache memories are not full before completing the migration of the SRC from the backend storage subsystem to the storage virtualization appliance, at step 535, the migration of the SRC is successfully completed. A completion event flag, which indicates a completion of transferring SRC from the backend storage subsystem to the storage virtualization appliance, is set. The completion event flag is also used for setting a cache memory operation mode (e.g., no-flush mode) in FIGS. 2-3. At step 540, upon completion of the migration of the SRC, the primary cache memory 16 and the secondary cache memory 24 are flushed. At step 545, the user is notified of completing the migration of the SRC. Once the transferring SRC is completed, the SRC at storage virtualization appliance becomes like any other SRC. The SRC at storage virtualization appliance is maintained in exactly the same way that the SRC at backend storage subsystem was maintained.

In one embodiment, while a redirection event flag is set (i.e., when a SRC at the storage virtualization appliance is just started) and a completion event is not set (i.e., while transferring SRC from the backend storage subsystem to the storage virtualization appliance), all new I/O requests are saved in both a primary cache memory 16 and a secondary cache memory 24, allowing a time window during which all outstanding I/O directed to the backend storage subsystem are completed, SRC at backend storage subsystem is stopped (e.g., mirroring between the primary storage device and the secondary storage device is not performed via a physical link 40 at the backend storage subsystem but performed via a physical link 30 at the storage virtualization appliance), and the secondary storage device (e.g., PPRC Secondary Y 26) is made as a readable and writable medium. The primary cache memory 16 and secondary cache memory 24 operates separately on each I/O request in write-through, read-write or no-flush mode.

Before transferring SRC from the backend storage subsystem to the storage virtualization appliance, data consistency between the primary site 10 and the secondary site 20 is maintained by writing operations via a physical link 40. While transferring SRC from the backend storage subsystem to the storage virtualization appliance, data consistency between the primary site 10 and the secondary site 20 is maintained by saving consistent data (e.g., saving same I/O requests) at the primary cache memory 16 and the secondary cache memory 24. The saved data (e.g., saved new I/O requests) at cache memories are submitted to the backend storage subsystem, right after completing the transferring SRC. After completion of transferring SRC from the backend storage subsystem to the storage virtualization appliance, data consistency between the primary site 10 and the secondary site 20 is maintained by data transfer via a physical link 30. Therefore, data consistency is maintained before transferring SRC, during transferring SRC, and after completion of transferring SRC. While transferring SRC from the backend storage subsystem to the storage virtualization appliance, new I/O requests from a host device or a host application 12 can be submitted to the storage virtualization appliance and then the new I/O requests are saved at the primary cache memory 16 and the secondary cache memory 24. Therefore, there is no impact on the host device or host application 12, while transferring SRC.

One of ordinary skill in the art understands that the time when a cache memory becomes fill is related to a size of the cache memory and the amount of I/O requests from a host device or a host application 12. The time spent on transferring SRC from the backend storage subsystem to the storage virtualization appliance takes several minutes for most virtualization appliance (e.g., IBM® San Volume Controller). In one embodiment of the present invention, when preparing migration of SRC from the backend storage subsystem to the storage virtualization appliance (e.g., step 505), all contents in the primary cache memory 16 and the secondary cache memory 24 are deleted to maximize available size of the primary cache memory 16 and the secondary cache memory 24.

In one embodiment, a plurality of host devices communicate with a backend storage subsystem and a storage virtualization appliance via SCSI (Small Computer System Interface). SCSI defines a set of standards for physically connecting and transferring data between computers and peripheral devices.

Although the preferred embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A system for servicing an I/O request from a host device while transferring SRC (Synchronous Peer to Peer Remote Copy) from a backend storage subsystem to a storage virtualization appliance, the SRC including a primary storage device at a primary site and a secondary storage device at a secondary site, the system comprising:
   the storage virtualization appliance for receiving an I/O request from a host device, the I/O request being directed to the primary storage device or the secondary storage device;
   the storage virtualization appliance for appending a cache operation tag on the I/O request, the cache operation tag indicating one of: a read-write mode indicating the I/O request is completed by a cache memory and the I/O request is sent to the backend storage subsystem later, a no-flush mode indicating the I/O request is completed by a cache memory and the I/O request is not sent to the backend storage subsystems until the no-flush mode is turned off, and a write-through mode indicating the I/O request is forwarded to the backend storage subsystem by a cache memory and the I/O request is completed by the backend storage subsystem;
   a primary cache memory, at the primary site, for receiving and storing the I/O request with the cache operation tag from the I/O tag appending means and operating according to one of: the read-write mode, the no-flush mode, and the write-through mode; and
   a secondary cache memory, at a secondary site, for receiving and storing the I/O request with the cache operation tag from the I/O tag appending means and for operating according to one of two modes, the two modes comprising: the read-write mode and the no-flush mode,
   while transferring the SRC from the backend storage subsystem to the storage virtualization appliance, the primary cache memory and the secondary cache memory prevent any new I/O request from being submitted to the backend storage subsystem,
   wherein data consistency is maintained between the primary site and the secondary site with no interruption in servicing the I/O request issued from the host device, while transferring the SRC from the backend storage subsystem to the storage virtualization appliance,
   wherein the backend storage subsystem includes the primary storage device and the secondary storage device.

2. The system according to claim 1, further comprising:
   a sensor associated with the primary cache memory or the secondary cache memory for detecting a redirection event flag, the redirection event flag indicating the I/O request from the host needs to be redirected to SRC at the storage virtualization appliance; and
   a sensor associated with the storage virtualization appliance for detecting a completion event flag, the completion event flag indicating a completion of transferring SRC from the backend storage subsystem to the storage virtualization appliance.

3. The system according to claim 2, wherein when the sensor associated with the primary cache memory or the secondary cache memory detects the redirection event flag is not set, the storage virtualization appliance appends the write-through operation mode tag on the I/O request.

4. The system according to claim 2, wherein when the sensor associated with the storage virtualization appliance detects the transferring SRC is not completed, the I/O tag appending means appends the no-flush operation mode tag on the I/O request.

5. The system according to claim 2, wherein when the sensor associated with the storage virtualization appliance detects the transferring SRC is completed, the I/O tag appending means appends the read-write operation mode tag on the I/O request.

6. The system according to claim 2, wherein the sensor associated with the storage virtualization appliance detects the transferring SRC is completed, the primary cache memory and the secondary cache memory are flushed.

7. The system according to claim 1, wherein the primary cache memory and the secondary cache memory are flushed, if the primary cache memory or the secondary cache memory become full before transferring SRC from the backend storage subsystem to the storage virtualization application is completed.

8. The system according to claim 1, wherein when there is no outstanding I/O request in the primary cache memory, SRC at the backend storage subsystem is stopped and the SRC is made available at the storage virtualization appliance.

9. A method for servicing an I/O request from a host device while transferring SRC (Synchronous Peer to Peer Remote Copy) from a backend storage subsystem to a storage virtualization appliance, the SRC including a primary storage device at a primary site and a secondary storage device at a secondary site, the method comprising:
   providing, at the backend storage subsystem, the primary storage device and the secondary storage device;
   receiving an I/O request from a host device, the I/O request being directed to the primary storage device or the secondary storage device;
   appending a cache operation tag on the I/O request, the cache operation tag indicating one of: a read-write mode indicating the I/O request is completed by a cache memory and the I/O request is sent to the backend storage subsystem later, a no-flush mode indicating the I/O request is completed by a cache memory and the I/O request is not sent to the backend storage subsystems until the no-flush mode is turned off and a write-through mode indicating the I/O request is forwarded to the backend storage subsystem by a cache memory and the I/O request is completed by the backend storage subsystem;
   receiving and storing the I/O request with the cache operation tag at a primary cache memory in the primary site and operating the primary cache memory according to one of: the read-write mode, the no-flush mode, and the write-through mode; and receiving and storing the I/O request with the cache operation tag at a secondary cache memory in the secondary site and operating the secondary cache memory according to one of two modes, the two modes comprising: the read-write mode and the no-flush mode, while transferring the SRC from the backend storage subsystem to the storage virtualization appliance, the primary cache memory and the secondary cache memory prevent any new I/O request from being submitted to the backend storage subsystem, wherein data consistency is maintained between the primary site and the secondary site with no interruption in servicing the I/O request issued from the host device, while transferring the SRC from the backend storage subsystem to the storage virtualization appliance.

10. The method according to claim 9, further comprising:
detecting a redirection event flag, the redirection event flag indicating the I/O request from the host needs to be redirected to SRC at the storage virtualization appliance; and detecting a completion event flag, the completion event flag indicating a completion of transferring SRC from the backend storage subsystem to the storage virtualization appliance.

11. The method according to claim 10, wherein when the redirection event flag is not set, the write-through operation mode tag is appended on the I/O request.

12. The method according to claim 10, wherein when the transferring SRC is not completed, the no-flush operation mode tag is appended on the I/O request.

13. The method according to claim 10, wherein when the transferring SRC is completed, the read-write operation mode tag is appended on the I/O request.

14. The method according to claim 10, wherein the transferring SRC is completed, the primary cache memory and the secondary cache memory are flushed.

15. The method according to claim 9, wherein the primary cache memory and the secondary cache memory are flushed, if the primary cache memory or the secondary cache memory become full before transferring SRC from the backend storage subsystem to the storage virtualization application is completed.

16. The method according to 9, wherein when there is no outstanding I/O request in the primary cache memory, SRC at the backend storage subsystem is stopped and the SRC is made available at the storage virtualization appliance.

17. A computer program product comprising computer non-transitory medium having computer readable program code means embodied therein for causing a computer to receive an I/O request from a host device and providing data consistency while transferring the SRC from the backend storage subsystem to the storage virtualization appliance, the computer program code means in said computer program product comprising computer readable program code means for causing the computer to effect the functions of claim 9.

18. A computer program storage device, readably by machine, tangibly embodying a program of instructions executable by a machine to perform method steps for receiving an I/O request from a host device and providing data consistency while transferring SRC from a backend storage subsystem to a virtualization appliance, said method steps comprising the steps of claim 9.

* * * * *